US012060944B2

(12) United States Patent
Masumi et al.

(10) Patent No.: US 12,060,944 B2
(45) Date of Patent: Aug. 13, 2024

(54) MECHANICAL SEAL

(71) Applicant: EAGLE INDUSTRY CO., LTD., Tokyo (JP)

(72) Inventors: Yuki Masumi, Tokyo (JP); Akihiro Takahashi, Tokyo (JP); Tomohiro Uchiyama, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/008,124

(22) PCT Filed: Jun. 14, 2021

(86) PCT No.: PCT/JP2021/022550
§ 371 (c)(1),
(2) Date: Dec. 2, 2022

(87) PCT Pub. No.: WO2021/261317
PCT Pub. Date: Dec. 30, 2021

(65) Prior Publication Data
US 2023/0279950 A1 Sep. 7, 2023

(30) Foreign Application Priority Data
Jun. 23, 2020 (JP) .................................. 2020-107548

(51) Int. Cl.
*F16J 15/34* (2006.01)
(52) U.S. Cl.
CPC ................................ *F16J 15/3436* (2013.01)
(58) Field of Classification Search
CPC ........ F16J 15/34; F16J 15/3436; F16J 15/344; F16J 15/3464; F16J 15/348
See application file for complete search history.

(56) References Cited

U.S. PATENT DOCUMENTS

2003/0122313 A1* 7/2003 Takahashi ............ F16J 15/3484
277/358
2007/0262532 A1* 11/2007 Ohama ................ F16J 15/3404
277/390

(Continued)

FOREIGN PATENT DOCUMENTS

EP 1213516 6/2002 ............... F16J 15/34
EP 3228907 10/2017 ............... F16J 15/34

(Continued)

OTHER PUBLICATIONS

International Search Report, Written Opinion and International Preliminary Report on Patentability issued in PCT International Patent Application Serial No. PCT/JP2021/022550, dated Jul. 27, 2021 with translation, 20 pgs.

*Primary Examiner* — Gilbert Y Lee
(74) *Attorney, Agent, or Firm* — HAYES SOLOWAY P.C.

(57) ABSTRACT

A mechanical seal includes: a mating ring; a seal ring; a casing which includes a pop-out regulation portion supporting the seal ring not to be rotatable and to be axially movable and coming into contact with the seal ring to regulate the seal ring from popping out toward the mating ring; an urging member disposed between the seal ring and a back wall of the casing axially overlapping with the seal ring and axially urges the seal ring toward the mating ring; and an annular secondary seal sealing a gap between the casing and the seal ring. The casing includes a regulation wall which regulates the secondary seal from moving toward the side opposite to the mating ring and an axial dimension between the seal ring and the regulation wall is equal to or less than a half of an axial dimension of the secondary seal while the seal ring and the pop-out regulation portion are in contact with each other.

4 Claims, 7 Drawing Sheets

(56) References Cited

U.S. PATENT DOCUMENTS

2018/0128378 A1* 5/2018 Tokunaga ............ F16J 15/3412
2018/0135699 A1* 5/2018 Tokunaga .............. F16J 15/348

FOREIGN PATENT DOCUMENTS

| JP | S59100148 | 4/1984 | ............... F16J 15/34 |
| JP | 2002267026 | 9/2002 | ............... F16J 15/34 |
| JP | 2011074931 | 4/2011 | ............... F16J 15/34 |
| WO | WO2016088659 | 6/2019 | ............... F16J 15/34 |

* cited by examiner (a)

(b)

(c)

(b)

(c)

MECHANICAL SEAL

TECHNICAL FIELD

The present invention relates to a mechanical seal used for sealing a rotating shaft of a rotating machine.

BACKGROUND ART

A mechanical seal is used by being attached between a housing of a rotating machine of, for example, automobiles, general industrial machines, or other sealing fields and a rotating shaft disposed to penetrate the housing and prevents a fluid inside the rotating machine from leaking from the inside to the outside or from the outside to the inside by allowing a sliding surface of a seal ring fixed to the housing to slide on a sliding surface of a mating ring rotating together with the rotating shaft. Since the seal ring is axially pressed toward the mating ring by a spring, it is possible to maintain a sliding state between the sliding surfaces of the seal ring and the mating ring even when the sliding surfaces are abraded.

A mechanical seal shown in Patent Citation 1 has a configuration in which a seal ring, a casing, a spring, a spring holder, and an O-ring are unitized and is easily attached to a rotating machine. The casing includes a cylindrical inner diameter portion which is inserted through a seal ring, an annular back wall which extends from a back end portion of the inner diameter portion in an outer diameter direction, and a cylindrical outer diameter portion which axially extends from an outer diameter side end portion of the back wall toward a mating ring. Further, the spring holder and the spring are arranged between a back wall of the seal ring and the back wall of the casing, and hence the seal ring is urged toward the mating ring.

The O-ring is disposed between an outer peripheral surface of the inner diameter portion of the casing and an inner peripheral surface of the seal ring, and the seal ring is attached to the casing to be axially movable while the leakage of the fluid is prevented. Further, the outer diameter portion of the casing is provided with a cut-up piece which is bent toward the inner diameter side of the casing and cut up to extend toward the back side of the casing and the cut-up piece is disposed in a groove of the seal ring to regulate the rotation of the seal ring. Further, when the seal ring before fixing the casing to the housing is urged by the spring via the spring holder and pressed forward, a back end portion of the cut-up piece comes into contact with an outer diameter side surface of the spring holder to regulate the seal ring from popping out toward the mating ring.

CITATION LIST

Patent Literature

Patent Citation 1: Microfilm of JP 1982-121412 U (JP S59-100148 U) (Pages 3 and 4, FIG. 2)

SUMMARY OF INVENTION

Technical Problem

As the rotating machine is becoming smaller, the mechanical seal is required to have a compact structure. However, in the mechanical seal shown in Patent Citation 1, since the spring and the spring holder are arranged on the back surfaces of the seal ring and the secondary seal, there is concern that the axial dimension of the mechanical seal increases.

The present invention has been made in view of such a problem and an object thereof is to provide a mechanical seal having a short axial dimension and capable of reliably sealing a secondary seal.

Solution to Problem

In order to solve the foregoing problem, a mechanical seal according to the present invention includes: a mating ring; a seal ring which slides relative to the mating ring; a casing which includes a pop-out regulation portion supporting the seal ring not to be rotatable and to be axially movable and coming into contact with the seal ring to regulate the seal ring from popping out toward the mating ring; an urging member that is disposed between the seal ring and a back wall of the casing axially overlapping with the seal ring and axially urges the seal ring toward the mating ring; and a secondary seal which is formed in an annular shape and which seals a gap between the casing and the seal ring while being radially press-inserted thereinto, wherein the casing includes a regulation wall which regulates the secondary seal from moving toward a side opposite to the mating ring in an axial direction, and wherein an axial dimension between the seal ring and the regulation wall is equal to or less a half of an axial dimension of the secondary seal while the seal ring and the pop-out regulation portion are in contact with each other. According to the aforesaid feature of the present invention, since the regulation wall is provided in the casing, a member such as a spring holder is not necessary and the axial dimension of the mechanical seal can be shortened. Further, since the axial dimension between the seal ring and the regulation wall is the axial dimension or less from the axial center of the secondary seal to the regulation wall, a gap between the seal ring and the casing can be reliably sealed by the secondary seal when the seal ring and the casing are assembled and the seal ring is held at a regulation position not popping out of the casing.

It may be preferable that an extension portion extending in the axial direction is provided on a back side of the seal ring, and the urging member and the secondary seal are respectively arranged on an inner diameter side and an outer diameter side of the extension portion. According to this preferable configuration, since the urging member and the secondary seal are divided by the extension portion, it is possible to reliably prevent the interference between the urging member and the secondary seal and to reliably seal a gap between the seal ring and the casing by the secondary seal.

It may be preferable that the regulation wall is a front wall of a step portion integrally molded to protrude from the back wall toward the mating ring. According to this preferable configuration, since the step portion protrudes toward the mating ring in relation to the back wall of the casing, the secondary seal can be disposed closer to the mating ring than the back wall. Accordingly, it is possible to reliably seal a gap between the casing and the seal ring by the secondary seal while ensuring the axial length of the space for disposing the urging member. Further, since the step portion is integrally molded with the casing, the regulation wall can have a simple configuration.

It may be preferable that the urging member directly comes into contact with the seal ring and the casing. According to this preferable configuration, since it is possible to decrease the number of parts of the mechanical seal, it is possible to shorten the axial dimension of the mechanical seal and to reduce the integrated tolerance of parts.

DESCRIPTION OF EMBODIMENTS

Modes for carrying out a mechanical seal according to the present invention will be described below on the basis of the embodiments.

First Embodiment

A mechanical seal according to a first embodiment of the present invention will be described with reference to FIGS. 1 to 5. Additionally, in this embodiment, an outer diameter side of a seal ring will be described as a sealed fluid side (i.e., high pressure side) and an inner diameter side thereof will be described as an atmosphere side (i.e., low pressure side). Additionally, a sliding surface side of the seal ring will be described as a front side.

Figure 1:
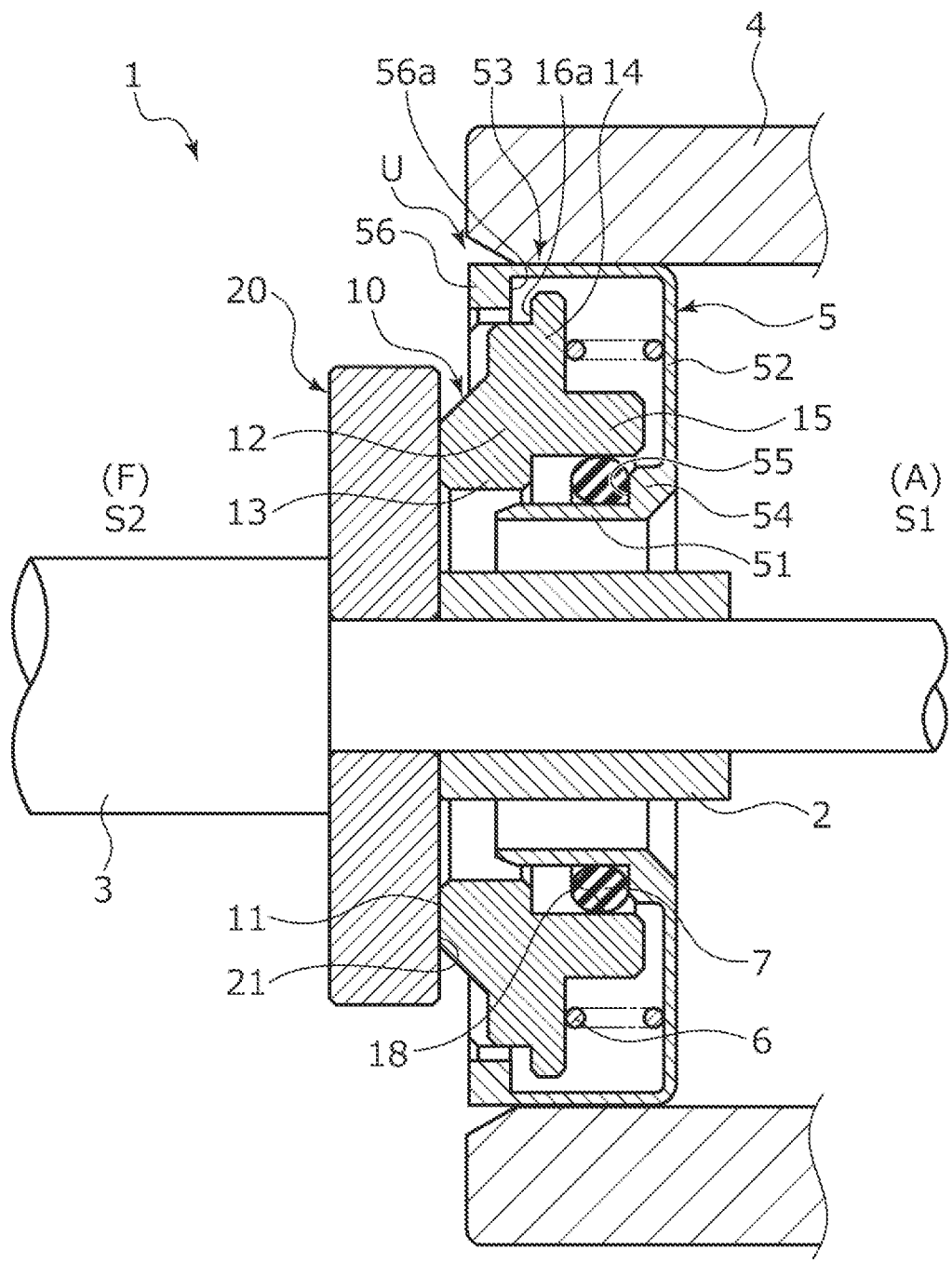
FIG. 1 is a longitudinal sectional view showing a mechanical seal according to a first embodiment of the present invention.

A mechanical seal 1 shown in FIG. 1 is of an inside type in which an inner space S1 is formed on the inner diameter side of the sliding surface, an outer space S2 is formed on the outer diameter side of the sliding surface, a sealed fluid F leaking from the outer diameter side to the inner diameter side of the sliding surface is sealed, and an atmosphere A passes through an inner space S1. Additionally, in this embodiment, an example in which the sealed fluid F is a high-pressure liquid and the atmosphere A is a gas having a lower pressure than that of the sealed fluid F is illustrated.

The mechanical seal 1 mainly includes an annular mating ring 20 and a seal ring unit U. The mating ring 20 is provided on a rotating shaft 3 to be rotatable together with the rotating shaft 3 through a sleeve 2. The seal ring unit U is fixed to a housing 4 of an attached device.

The seal ring unit U includes a casing 5 which is fixed to the housing 4, a seal ring 10 which is provided in the casing 5 not to be rotatable and to be axially movable, a spring 6 which is an urging member disposed between the casing 5 and the seal ring 10, and an O-ring 7 which is a secondary seal sealing a gap between the casing 5 and the seal ring 10.

When the seal ring 10 is axially urged by the spring 6, a sliding surface 11 of the seal ring 10 and a sliding surface 21 of the mating ring 20 slide closely with each other.

The seal ring 10 and the mating ring 20 are typically formed of SiC (as an example of hard material) or a combination of SiC and carbon (as an example of soft material), but the present invention is not limited thereto. The sliding material which can be used as the sliding material for the mechanical seal can be applied. In addition, examples of SiC include materials composed of two or more types of phases having different components and compositions, for example, SiC in which graphite particles are dispersed, reaction sintered SiC composed of SiC and Si, SiC—TiC, SiC—TiN, and the like as well as sintered bodies using boron, aluminum, carbon, and the like as sintering aids and examples of the carbon include resin-molded carbon, sintered carbon, and the like as well as carbon which is a mixture of carbonaceous and graphite. In addition to the above-described sliding materials, metal materials, resin materials, surface modification materials (e.g., coating materials), composite materials, and the like can also be applied.

Figure 2:
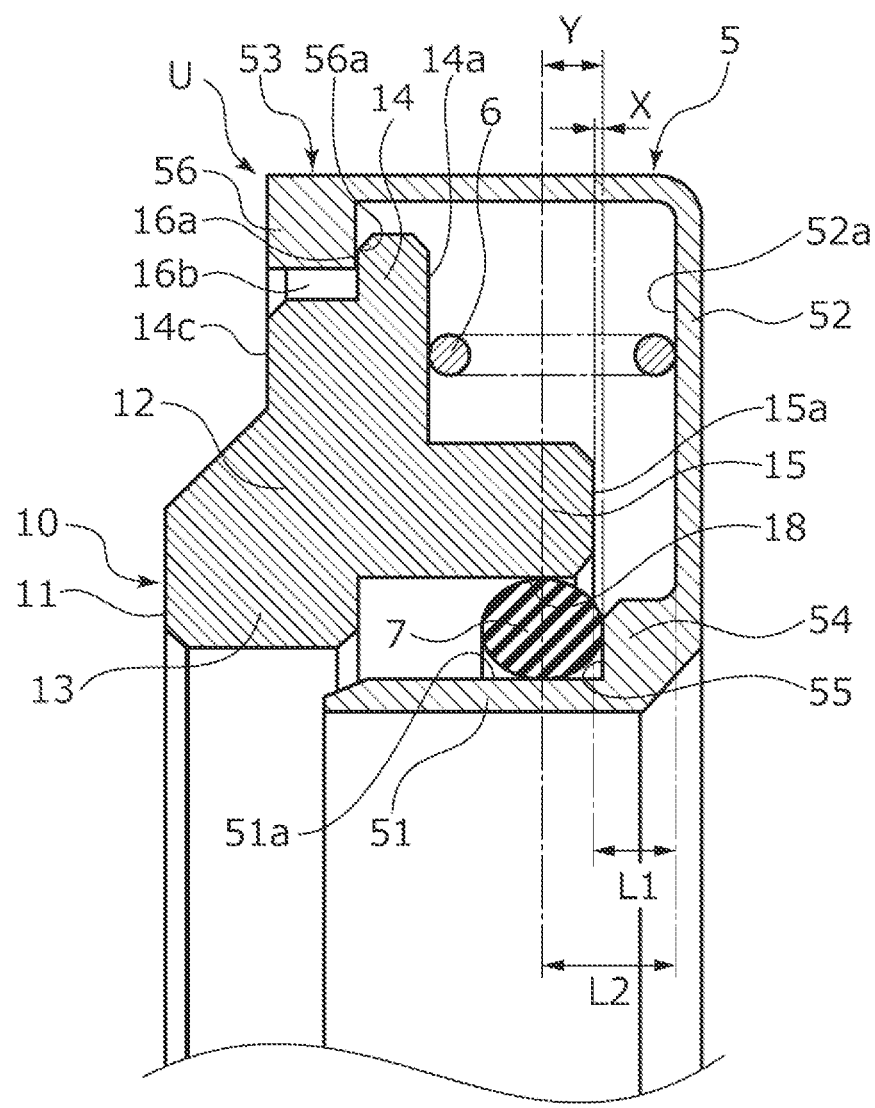
FIG. 2 is a cross-sectional view showing a seal ring unit including a seal ring, a casing, a spring, and an O-ring in the first embodiment.

FIG. 2 shows the seal ring unit U as a single unit. As will be described in detail later, since the seal ring unit U can be maintained in a unit state without separating the seal ring 10, the casing 5, the spring 6, and the O-ring 7, they can be carried for each seal ring unit U.

As shown in FIG. 2, the seal ring 10 includes a base portion 12, a front extension portion 13 which extends from the base portion 12 toward the front side, an outer diameter extension portion 14 which extends from the base portion 12 toward the outer diameter side, and a cylindrical back extension portion 15 which is an extension portion extending from the base portion 12 toward the back side, that is, the side opposite to the mating ring 20. The sliding surface 11 is provided on the front side of the front extension portion 13.

As shown in FIG. 2, the casing 5 includes a cylindrical inner diameter portion 51 which is inserted through the seal ring 10, an annular back wall 52 which extends from the back side end portion of the inner diameter portion 51 toward the outer diameter direction and overlaps with the seal ring in the axial direction, and a cylindrical outer diameter portion 53 which extends in the axial direction from the outer diameter side end portion of the back wall 52 toward the mating ring 20.

An annular step portion 54 which protrudes toward the front side is provided at the inner diameter end portion, that is, the inner corner portion of the back wall 52 and the step portion 54 is integrally molded with the back wall 52 and the inner diameter portion 51. Further, a front wall 55 which is a regulation wall regulating the movement of the O-ring 7 toward the side opposite to the mating ring 20 in the axial direction is formed on the front side of the step portion 54. In addition, although it has been described such that the step portion 54 has an annular shape, the step portions may be arranged at a plurality of positions to be divided in the circumferential direction.

Figure 3:
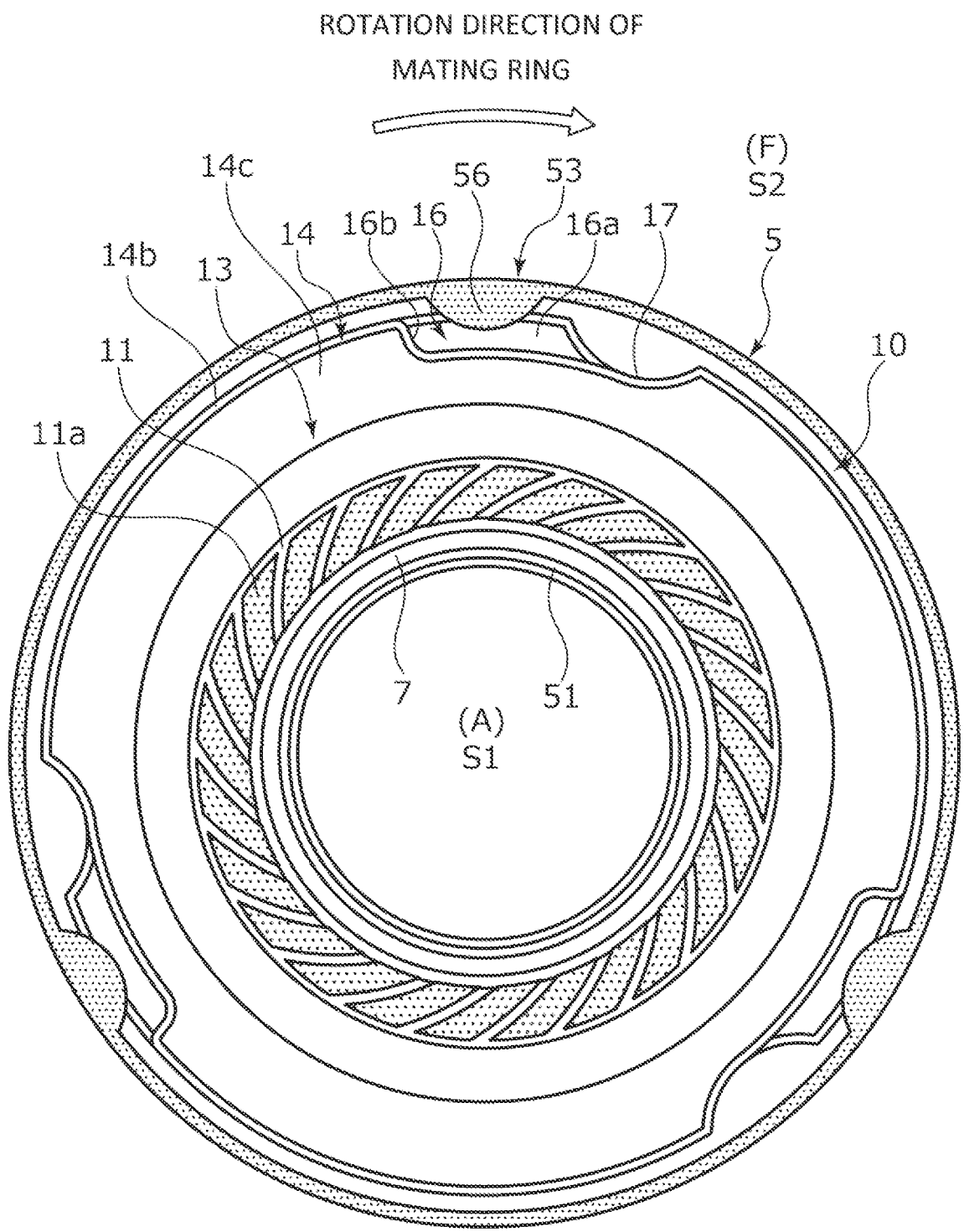
FIG. 3 is a front view showing the seal ring unit including the seal ring, the casing, the spring, and the O-ring in the first embodiment.
Figure 4:
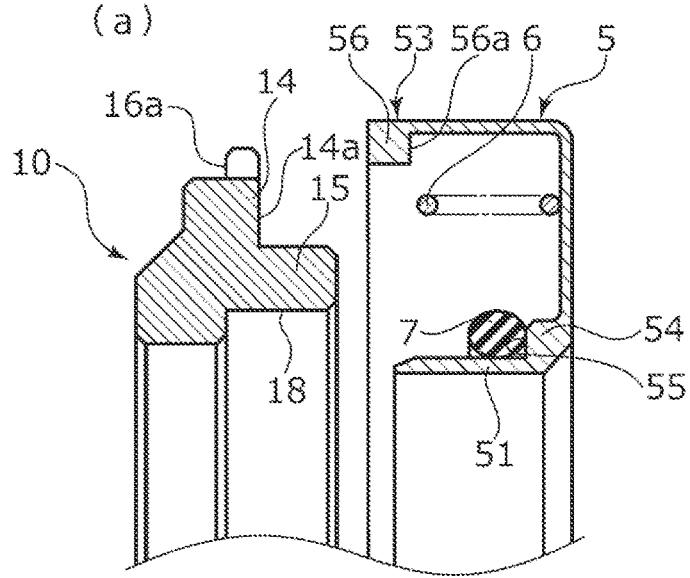
FIG. 4A is a cross-sectional view showing a state in which the spring and the O-ring are accommodated in the casing in the first embodiment.
FIG. 4B is a cross-sectional view showing a state in which the seal ring is press-inserted into the casing in the first embodiment.
FIG. 4C is a cross-sectional view showing a state in which the seal ring is rotated clockwise in the first embodiment.
Figure 4:
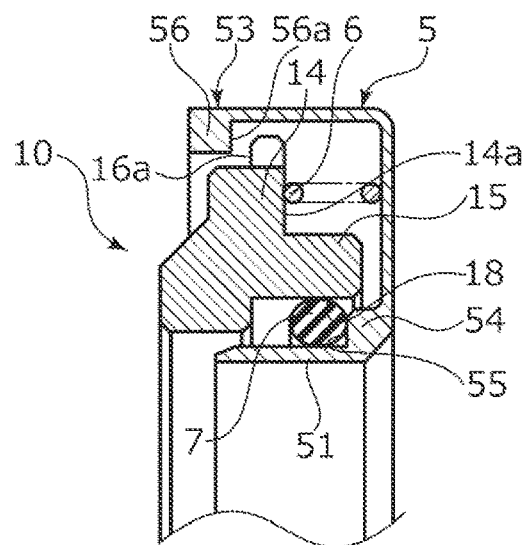
Figure 4:
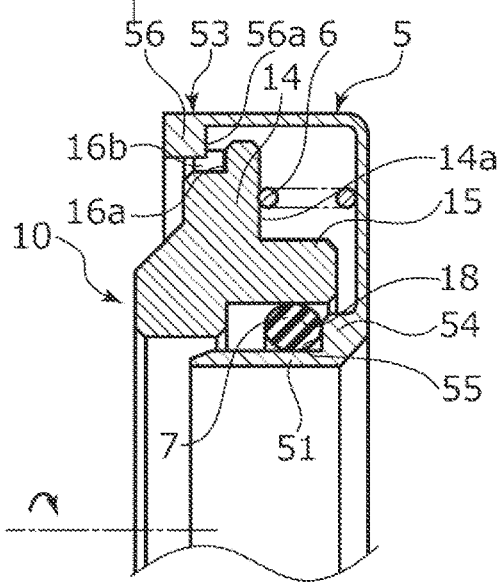
Figure 5:
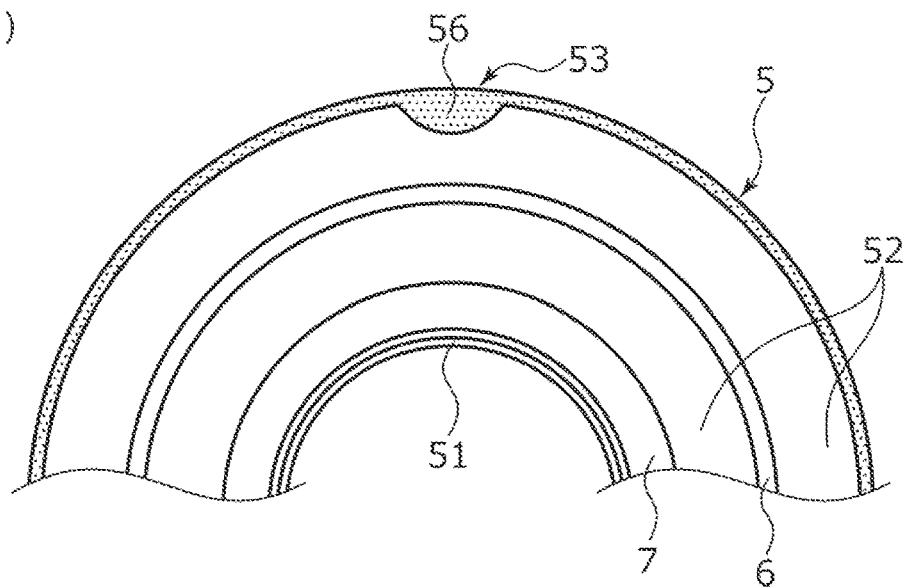
FIG. 5A is a front view showing a state in which the spring and the O-ring are accommodated in the casing in the first embodiment.
FIG. 5B is a front view showing a state in which the seal ring is press-inserted into the casing in the first embodiment.
FIG. 5C is a front view showing a state in which the seal ring is rotated clockwise in the first embodiment.
Figure 5:
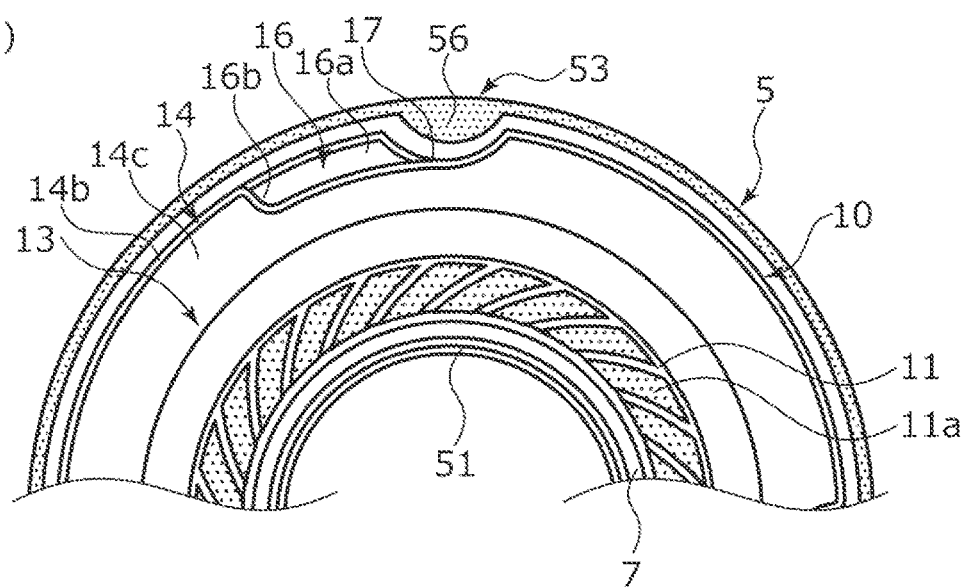
Figure 5:
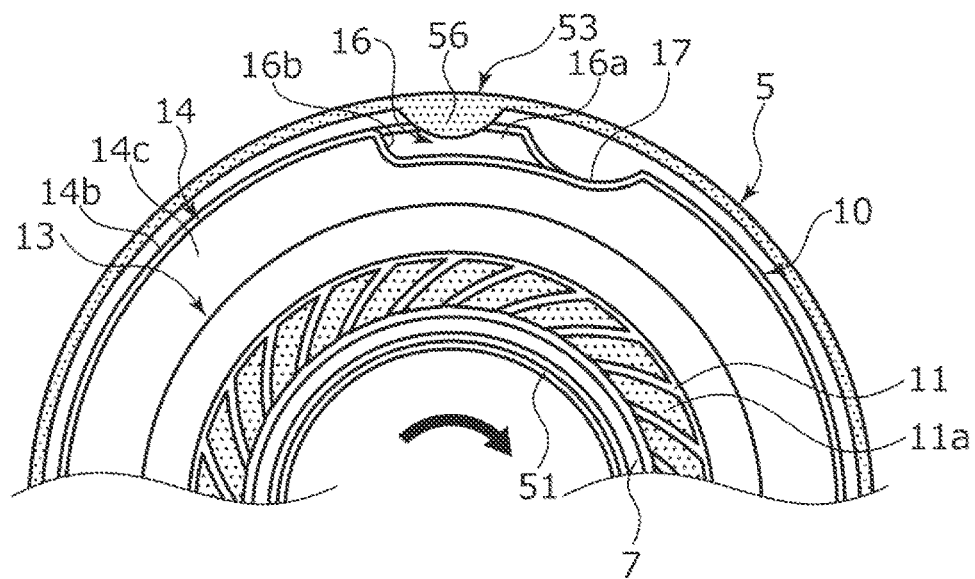

A pop-out regulation portion 56 which extends in the inner diameter direction is provided at the front end of the outer diameter portion 53. Further, as shown in FIG. 3, the pop-out regulation portion 56 is provided at three positions equally on the circumference on the front side of the outer diameter portion 53 of the casing 5 and has a substantially semi-circular shape smaller than a notch 17 of the seal ring 10. Further, for convenience of description, in the front view of FIG. 3 or the like, the outer diameter portion 53 of the casing 5 and a dynamic pressure generation groove 11a of the sliding surface 11 of the seal ring 10 are indicated by dots.

As shown in FIG. 2, the spring 6 is disposed between a back surface 14a and the back wall 52 while being axially compressed due to the contact with the back surface 14a of the outer diameter extension portion 14 of the seal ring 10 and an inner surface 52a of the back wall 52 of the casing 5 on the outer diameter side in relation to the back extension portion 15 of the seal ring 10. In addition, the type and shape of the spring 6 are not particularly limited.

Further, as shown in FIG. 2, the O-ring 7 is formed as an elastic member having a circular cross-section and is disposed between an inner peripheral surface 18 and an outer peripheral surface 51a in a radial press-contact state due to the contact with the inner peripheral surface 18 of the back extension portion 15 of the seal ring 10 and the outer peripheral surface 51a of the inner diameter portion 51 of the casing 5.

As shown in FIG. 3, a plurality of the dynamic pressure generation grooves 11a are formed on the inner diameter side of the sliding surface 11. Additionally, the dynamic pressure generation groove 11a is not limited to the arc shape and may have a different form such as a Rayleigh step or dimple. Further, the dynamic pressure generation groove 11a may be not formed on the sliding surface 11.

As shown in FIG. 3, the anti-rotation groove 16 and the notch 17 which are disposed at three positions equally in the circumferential direction are formed at an outer edge 14b of the outer diameter extension portion 14.

The notch 17 is formed in a shape notched in an arc shape to penetrate in the axial direction at an adjacent position of the anti-rotation groove 16 in the clockwise direction.

Specifically, the anti-rotation groove 16 includes a bottom surface 16a and an anti-rotation wall 16b. The bottom surface 16a is recessed one step from an outer diameter side surface 14c of the outer diameter extension portion 14 and extends by a predetermined dimension in the circumferential direction. The anti-rotation wall 16b extends vertically from the counterclockwise side edge of the bottom surface 16a toward the outer diameter side surface 14c.

Further, the spring 6 is located on the outer diameter in relation to the O-ring 7 and is disposed to partially overlap with the O-ring 7 in the radial direction. Further, the O-ring 7 comes into contact with the front wall 55 of the step portion 54 of the casing 5.

As shown in FIG. 2, in the single seal ring unit U, the bottom surface 16a of the anti-rotation groove 16 of the outer diameter extension portion 14 of the seal ring 10 to be described later is in contact with the back surface 56a of the pop-out regulation portion 56 of the outer diameter portion 53 of the casing 5 (hereinafter, referred to as a natural state).

When the seal ring unit U is in the natural state, an axial separation dimension X from the back surface 15a of the back extension portion 15 to the front wall 55 of the step portion 54 is smaller than a radius Y which is a half of the axial dimension of the O-ring 7 (i.e., X<Y). Therefore, a gap between the inner peripheral surface 18 of the back extension portion 15 of the seal ring 10 and the outer peripheral surface 51a of the inner diameter portion 51 of the casing 5 can be reliably sealed by the O-ring 7 which is a secondary seal.

In other words, an axial separation dimension L1 from the back surface 15a of the back extension portion 15 of the seal ring 10 to the inner surface 52a of the back wall 52 of the casing 5 is shorter than an axial separation dimension L2 from the axial center of the O-ring 7, that is, the axial center position exhibiting the sealing performance of the O-ring 7 to the inner surface 52a of the back wall 52 of the casing 5 (i.e., L1<L2).

When the seal ring unit U is in the natural state, the seal ring 10 is located on the frontmost side of the range of motion in the axial direction, that is, L1 is the maximum. Since the O-ring 7 comes into contact with the inner peripheral surface 18 of the back extension portion 15 of the seal ring 10 in that state, the seal ring unit U in the natural state is stable in the unitized state. Therefore, it is easy to carry the seal ring unit U.

Further, a gap between the casing 5 and the seal ring 10 can be reliably sealed by the O-ring 7 while the mechanical seal 1 is assembled to the rotating shaft 3 and the housing 4 as will be described later.

Next, the assembly of the seal ring unit U will be described. As shown in FIGS. 4A and 5A, the spring 6 and the O-ring 7 are first arranged inside the casing 5 while being separated from each other by a predetermined dimension in the radial direction. The O-ring 7 is externally fitted to the inner diameter portion 51 of the casing 5 while coming into contact with the front wall 55 of the step portion 54 of the casing 5.

Next, as shown in FIGS. 4B and 5B, the seal ring 10 is inserted into the casing 5.

Specifically, as shown in FIG. 5B, the seal ring 10 is moved toward the back side after the circumferential position of the seal ring 10 is adjusted so that the notch 17 of the outer diameter extension portion 14 of the seal ring 10 overlaps with the pop-out regulation portion 56 of the outer diameter portion 53 of the casing 5.

Then, the seal ring 10 is further moved toward the back side against the axial urging force due to the compression of the spring 6 while the front end portion of the spring 6 comes into contact with the back surface 14a of the outer diameter extension portion 14 of the seal ring 10 and the bottom surface 16a of the anti-rotation groove 16 of the outer diameter extension portion 14 of the seal ring 10 is moved to reach the back side in relation to the back surface 56a of the pop-out regulation portion 56 of the casing 5 (see FIG. 4B).

At this time, the inner peripheral surface 18 of the back extension portion 15 of the seal ring 10 slides on the O-ring 7 and the back extension portion 15 is inserted between the spring 6 and the O-ring 7 in the radial direction.

Next, as shown in FIGS. 4C and 5C, the seal ring 10 is rotated clockwise while maintaining the amount of pressing the seal ring 10 toward the back side. By this rotation, the pop-out regulation portion 56 of the casing 5 moves inside the anti-rotation groove 16 of the seal ring 10 and the back surface 56a of the pop-out regulation portion 56 faces the bottom surface 16a of the anti-rotation groove 16. In addition, the excessive rotation of the pop-out regulation portion 56 can be prevented by the anti-rotation wall 16b of the anti-rotation groove 16.

Then, the seal ring 10 is pressed back to the front side by the urging force of the spring 6 by releasing the pressed state to the back side of the seal ring 10, but when the bottom surface 16a of the anti-rotation groove 16 of the seal ring 10 comes into contact with the back surface 56a of the pop-out regulation portion 56 of the casing 5, the seal ring 10 is regulated from popping out of the casing 5 (see FIGS. 2 and 3). At this time, the seal ring unit U is in the natural state.

Next, the assembly of the mechanical seal 1 to the rotating shaft 3 and the housing 4 will be described. Referring to FIG. 1, the mating ring 20 is first fixed to the rotating shaft 3 by using the sleeve 2. Next, the casing 5 of the seal ring unit U is fixed to a predetermined position of the housing 4.

Then, the rotating shaft 3 is inserted through the inner diameter hole of the seal ring unit U, the mating ring 20 fixed to the rotating shaft 3 is brought into contact with the seal ring 10, and the axial position of the rotating shaft 3 is adjusted and fixed so that the rotating shaft 3 is further pressed toward the back side against the urging force of the spring 6.

At this time, the bottom surface 16a of the anti-rotation groove 16 of the outer diameter extension portion 14 of the seal ring 10 is separated from the back surface 56a of the pop-out regulation portion 56 of the outer diameter portion 53 of the casing 5 toward the back side and the seal ring 10 is axially pressed toward the mating ring 20 by the spring 6. Therefore, it is possible to maintain the sliding contact state between the sliding surfaces 11 and 21 even when the sliding surfaces 11 and 21 of the seal ring 10 and the mating ring 20 are abraded. In addition, the assembly procedure of the mechanical seal 1 is not limited thereto.

Accordingly, since it is possible to assembling the mechanical seal 1 to the rotating shaft 3 and the housing 4 without disassembling the seal ring unit U, it is possible to simplify the assembly of the mechanical seal 1.

Further, since the anti-rotation wall 16b of the anti-rotation groove 16 of the seal ring 10 comes into contact with the pop-out regulation portion 56 of the casing 5 during the rotation of the mating ring 20 when the seal ring 10 rotates together in the rotation direction of the mating ring 20, that is, clockwise by referring to FIG. 3, the idle rotation of the seal ring 10 can be prevented.

Figure 6:
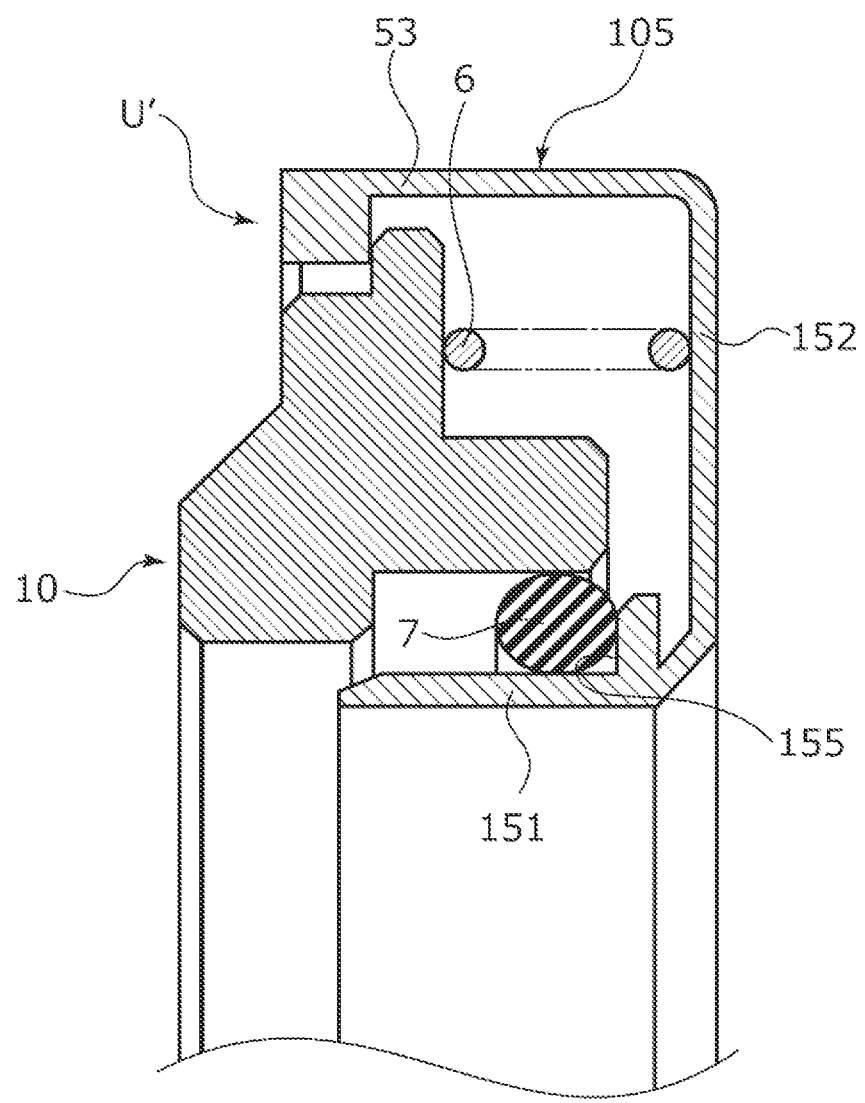
FIG. 6 is a cross-sectional view showing a seal ring unit including a seal ring, a casing, a spring, and an O-ring of a first modified example of the first embodiment.

A first modified example of the first embodiment will be described. The same components as those shown in the above-described embodiment are designated by the same reference numerals, and duplicate description will be omitted. As shown in FIG. 6, a casing 105 constituting a seal ring unit U' includes an inner diameter portion 151, a back wall 152, and an outer diameter portion 53. The casing 105 is provided with an annular regulation wall 155 which extends from the inner diameter portion 151 toward the outer diameter side and faces the back wall 152.

In this way, since the casing 105 is provided with the regulation wall 155 which regulates the movement of the O-ring 7 toward the back side, it is possible to reliably seal a gap between the casing 105 and the seal ring 10 by the O-ring 7. Further, the O-ring 7 is easily positioned to the casing 5.

As described above, since the casing 5 is provided with the front wall 55, a member such as a spring holder is not necessary and the axial dimension of the mechanical seal 1 can be shortened. Further, since an axial dimension X between the seal ring 10 and the front wall 55 is equal to or less than the radius Y of the O-ring 7 while the seal ring 10 and the pop-out regulation portion 56 come into contact with each other, a gap between the seal ring 10 and the casing 5 can be reliably sealed by the O-ring 7 when the seal ring 10 and the casing 5 are assembled and the seal ring 10 is held at a regulation position not to pop out of the casing 5.

Further, since the spring 6 is disposed to partially overlap with the O-ring 7 at a different position in the radial direction, the spring 6 and the O-ring 7 do not interfere with each other. Accordingly, it is possible to shorten the axial dimension of the seal ring unit U of the mechanical seal 1.

Further, the back extension portion 15 which extends in the axial direction is provided on the back side of the seal ring 10. The back extension portion 15 divides the seal ring so that the O-ring 7 is disposed on the inner diameter side and the spring 6 is disposed on the outer diameter side. Accordingly, it is possible to reliably seal a gap between the seal ring 10 and the casing 5 by the O-ring 7 by reliably preventing the interference between the spring 6 and the O-ring 7.

Further, the regulation wall is the front wall 55 of the step portion 54 which is integrally molded to extend from the back wall 52 of the casing 5 toward the front side. The O-ring 7 is disposed on the front side of the back wall 52 while coming into contact with the front wall 55. Accordingly, it is possible to reliably seal a gap between the casing 5 and the seal ring 10 by the O-ring 7 while ensuring the axial length of the space for disposing the spring 6. Further, since the step portion 54 is integrally molded with the casing 5, the regulation wall can have a simple configuration.

Further, it is possible to reliably prevent the back extension portion 15 and the back wall 52 from biting the O-ring 7 when the back extension portion 15 of the seal ring 10 approaches the back wall 52 of the casing 5.

Further, since the spring 6 directly comes into contact with the seal ring 10 and the casing 5, it is possible to decrease the number of parts of the seal ring unit U of the mechanical seal 1. Accordingly, it is possible to shorten the axial dimension of the seal ring unit U and to reduce the integrated tolerance of parts.

Second Embodiment

Next, a mechanical seal according to a second embodiment of the present invention will be described with reference to FIG. 7. In addition, the description of the overlapping configuration in the same configuration as that of the above-described embodiment will be omitted.

Figure 7:
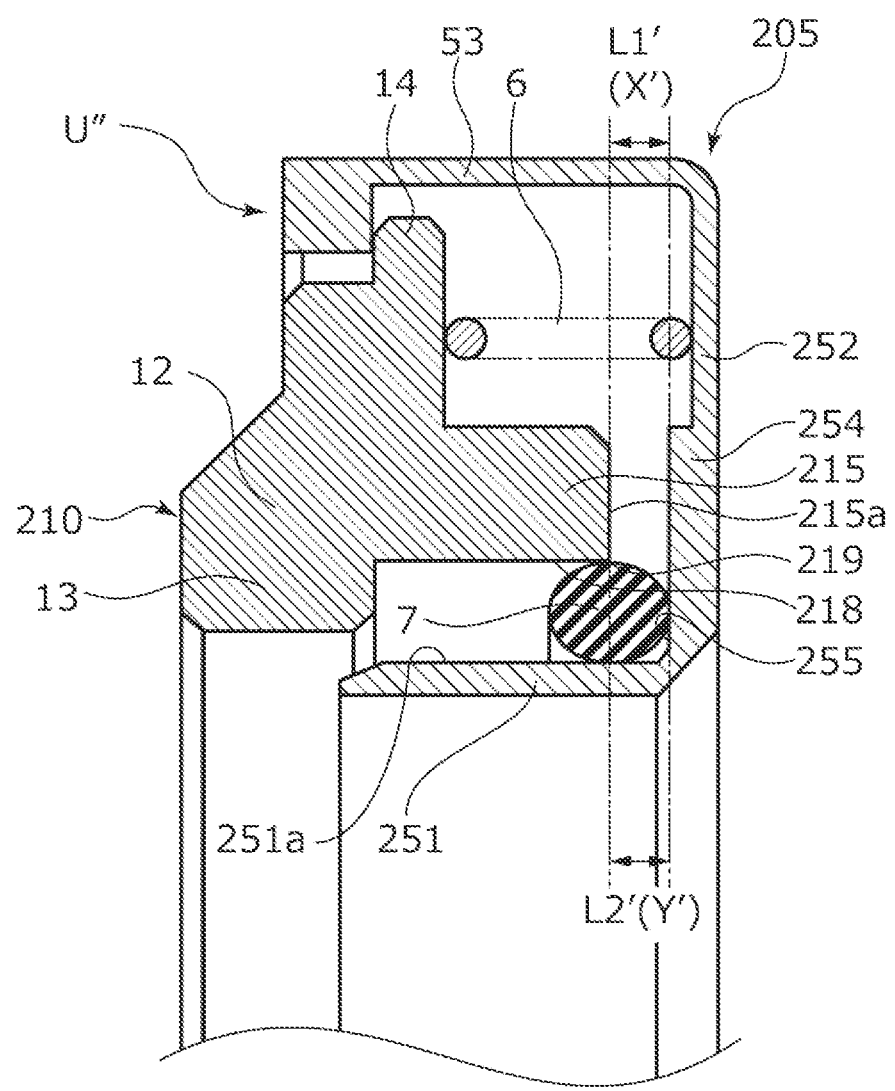
FIG. 7 is a cross-sectional view showing a seal ring unit including a seal ring, a casing, a spring, and an O-ring of a mechanical seal according to a second embodiment of the present invention.

As shown in FIG. 7, a seal ring 210 constituting a seal ring unit U" includes a base portion 12, a front extension portion 13, an outer diameter extension portion 14, and a back extension portion 215 as an extension portion. A back surface 215a of the back extension portion 215 and an inner peripheral surface 218 constitute a corner portion 219.

Further, a casing 205 constituting the seal ring unit U" includes an inner diameter portion 251, a back wall 252, and an outer diameter portion 53. A step portion 254 which slightly extends toward the front side is provided on the inner diameter side of the back wall 252 and a front wall 255 which is a regulation wall is formed in front of the step portion 254. The step portion 254 is provided in the radial direction from the inner diameter end of the back wall 252 to the outer diameter end of the back extension portion 215 of the seal ring 210.

When the seal ring unit U" is in the natural state, an axial separation dimension X' from the back surface 215a of the back extension portion 215 to the front wall 255 of the step portion 254 is the same as a radius Y' which is a half of the axial dimension of the O-ring 7 (X'=Y'). Therefore, a gap between the inner peripheral surface 218 of the back extension portion 215 of the seal ring 210 and an outer peripheral surface 251a of the inner diameter portion 251 of the casing 205 can be reliably sealed by the O-ring 7 which is the secondary seal. Additionally, L1' and L2' corresponding to the axial separation dimensions L1 and L2 of the first embodiment are respectively the same as the axial separation dimension X' and the radius Y' (i.e., L1'=X', L2'=Y').

When the seal ring unit U" is in the natural state, the seal ring 210 is located on the frontmost side of the axial range of motion, that is, L1' is the maximum. In that state, the axial center of the O-ring 7 reliably comes into contact with the corner portion 219 of the seal ring 210. Accordingly, a gap between the casing 205 and the seal ring 210 can be reliably sealed by the O-ring 7 in a state in which the seal ring unit U" is assembled to the housing 4, that is, the back surface 215a is close to the front wall 255, that is, the axial center of the O-ring 7 is disposed on the front side in relation to the back surface 215a.

Although examples of the present invention have been described above with reference to the drawings, the specific configuration is not limited to these examples and is included in the present invention even if there are changes or additions within the scope of the present invention.

For example, in the first and second embodiments, an example of an inside type that seals the sealed fluid F leaking from the outer diameter side to the inner diameter side of the sliding surface has been illustrated, but an outside type that seals the sealed fluid F leaking from the inner diameter side to the outer diameter side of the sliding surface may be used.

Further, although it has been described such that the anti-rotation groove, the notch, and the pop-out regulation portion are formed at three places equally on the circumference, the present invention is not limited thereto. For example, the anti-rotation groove, the notch, and the pop-out regulation portion may be formed at a plurality of positions equally on the circumference and may be formed unequally on the circumference if the anti-rotation groove, the notch, and the pop-out regulation portion respectively correspond to each other on the circumference.

Further, although it has been described such that the notch and the pop-out regulation portion have an arc shape, but the present invention is not limited thereto. For example, the notch and the pop-out regulation portion may have a rectangular shape.

Further, although it has been described such that the sealed fluid is a high-pressure liquid, the present invention is not limited thereto. For example, the sealed fluid may be a gas, a low-pressure liquid, or a mist obtained by mixing a liquid and a gas.

Further, the step portion and the regulation wall may be separated from the casing.

Further, the back extension portion may be separated from the seal ring.

REFERENCE SIGNS LIST

1 Mechanical seal
3 Rotating shaft
5 Casing
6 Spring (urging member)
7 O-ring (secondary seal)
10 Seal ring
15 Back extension portion (extension portion)
20 Mating ring
52 Back wall
54 Step portion
55 Front wall (regulation wall)
105 Casing
152 Back wall
155 Regulation wall
205 Casing
210 Seal ring
215 Back extension portion (extension portion)
252 Back wall
254 Step portion
255 Front wall (regulation wall)
A Atmosphere
F Sealed fluid
L1, L2 Axial separation dimension
L1', L2' Axial separation dimension
S1 Inner space
S2 Outer space
U, U', U" Seal ring unit
X, X' Axial separation dimension
Y, Y' Radius of O-ring (half of secondary seal in axial dimension)

The invention claimed is:

1. A mechanical seal, comprising:
a mating ring;
a seal ring configured to slide relative to the mating ring;
a casing which includes a pop-out regulation portion supporting the seal ring not to be rotatable and to be axially movable and coming into contact with the seal ring to regulate the seal ring from popping out toward the mating ring;
an urging member that is disposed between the seal ring and a back wall of the casing axially overlapping with the seal ring and configured to axially urge the seal ring toward the mating ring; and
a secondary seal which is formed in an annular shape and configured to seal a gap between the casing and the seal ring while being radially press-inserted thereinto,
wherein the casing includes a regulation wall which is configured to regulate the secondary seal from moving toward a side opposite to the mating ring in an axial direction,
wherein an axial dimension between the seal ring and the regulation wall is equal to or less than a half of an axial dimension of the secondary seal while the seal ring and the pop-out regulation portion are in contact with each other,
wherein an extension portion extending in the axial direction is provided on a back side of the seal ring, and
wherein the urging member and the secondary seal are respectively arranged on an inner diameter side and an outer diameter side of the extension portion.

2. The mechanical seal according to claim 1, wherein the regulation wall is a front wall of a step portion integrally molded and configured to protrude from the back wall toward the mating ring.

3. The mechanical seal according to claim 2, wherein the urging member is configured to directly come into contact with the seal ring and the casing.

4. The mechanical seal according to claim 1, wherein the urging member is configured to directly come into contact with the seal ring and the casing.

* * * * *